United States Patent [19]

Loft et al.

[11] 4,293,360

[45] Oct. 6, 1981

[54] COATED SHEET MATERIAL FOR USE IN MAKING DECORATIVE LAMINATES

[75] Inventors: Fredrick A. Loft, South Windham; John O. H. Peterson, Standish, both of Me.

[73] Assignee: Scott Paper Company, Philadelphia, Pa.

[21] Appl. No.: 961,463

[22] Filed: Nov. 16, 1978

[51] Int. Cl.³ .............................................. B32B 31/00
[52] U.S. Cl. .................................... 156/230; 156/235; 156/288; 156/289; 156/300; 156/305; 427/209; 428/503; 428/511; 428/514; 428/913; 428/914
[58] Field of Search ............... 428/500, 510, 511, 514, 428/516, 518, 520, 523, 537, 914, 187, 204, 207, 166, 40, 352, 354, 913, 503; 156/230, 238, 300, 305, 332, 334, 235, 288, 289; 427/209; 162/127, 136, 164 R, 168 R

[56] References Cited

U.S. PATENT DOCUMENTS

| Re. 27,644 | 5/1973 | Kelly et al. | 428/327 |
| 2,866,771 | 12/1958 | Sellers et al. | 428/520 X |
| 3,156,581 | 11/1964 | Finnegan et al. | 428/500 X |
| 3,520,469 | 7/1970 | Marx | 428/500 X |
| 3,520,861 | 7/1970 | Thomson et al. | 428/500 |
| 3,556,835 | 1/1971 | Sorell | 428/352 X |
| 3,583,932 | 6/1971 | Benton et al. | 428/441 |
| 4,030,955 | 6/1977 | Antonio et al. | 156/235 |
| 4,093,458 | 6/1978 | McGrail | 427/209 |
| 4,118,541 | 10/1978 | Power et al. | 428/511 X |
| 4,144,120 | 3/1979 | Eldin et al. | 162/136 |

*Primary Examiner*—Bruce H. Hess
*Attorney, Agent, or Firm*—R. Duke Vickrey; John W. Kane, Jr.

[57] ABSTRACT

Disclosed is a coated sheet material comprising a release medium having thereon a gluable coating for use in making a decorative heat-and-pressure consolidated laminate. The gluable coating is transferred during the consolidation step from the release medium to the back side of the laminate, and the laminate can then be glued to a reinforcing substrate with conventional glues and without sanding the back of the laminate. The transferable gluable coating comprises a linear copolymer of (A) maleic anhydride or maleic acid or maleic acid salt and (B) ethylene or a vinyl monomer having a side chain of an aliphatic group with up to four carbon atoms or an alkoxy group with up to four carbon atoms.

10 Claims, No Drawings

COATED SHEET MATERIAL FOR USE IN MAKING DECORATIVE LAMINATES

BACKGROUND OF THE INVENTION

Field of the Invention

In making decorative laminates, a plurality of sheets impregnated with a thermosetting resin are assembled in a stacked, superimposed relationship with a decorative sheet placed on top. The assembly is placed between platens and then heat-and-pressure consolidated.

Generally, more than one laminate is formed at one time by inserting a plurality of assembled sheets in a stack with each assembly being separated by a release sheet which allows the individual laminates to be separated after consolidation. The laminates so formed are then bonded to a reinforcing substrate, such as plywood, particle board or the like, by the use of adhesives such as contact adhesives, urea-formaldehyde, white glues (polyvinyl acetate emulsions) hot melts, phenolic or resorcinol-formaldehyde epoxy, coal tar, animal glues, and the like. The glues vary in their cost and reliability. A very commonly used glue in the industry is a polyvinyl acetate emulsion sold under the name Wood-Lok No. 40-0536. This glue is inexpensive and reliable, but is not versatile in the variety of laminating surfaces it will adhere to.

In the typical operation where polyvinyl acetate glues, as well as many of the other glues, are used, the laminate is first sanded on its back surface before it is glued to its supporting substrate. This is because the conventional glues will not directly adhere to the phenolic impregnated back sheet of the laminate. In addition, some of the release mediums used to separate laminates during consolidation permit some of the release material to transfer to the back surface of the laminate and reduce the gluability of the laminate to the reinforcing substrate. By back surface, it is meant the exposed flat surface of the laminate which is furthermost from the decorative sheet and which is to be glued to the reinforcing substrate.

The sanding operation is an expensive step in the process and adds to the cost of the product. The step can also be responsible for increased waste of the laminated material. Since the laminates are relatively inflexible after the resins contained therein have been thermoset during the consolidation process, the thin laminates are particularly susceptible to damage during the sanding step due to their brittleness.

It may be possible to eliminate the sanding step by using certain glues which have the ability to adhere to the phenolic impregnated back sheet. However, such glues are expensive and have not been readily accepted by manufacturers of reinforced laminates. Each manufacturer has learned through years of experience that he can rely upon certain glues. When considering his potential liability for laminates that separate from their reinforcing substrate after they have been fabricated into expensive furniture, cabinets and the like, it is understandable why the manufacturers are reluctant to change glues. Accordingly, the prevailing practice in the industry continues to be sanding the back surface of the laminate and using the well tested polyvinyl acetate glues.

There are existing techniques which are designed to provide a gluable back surface for the laminate without sanding. For example, U.S. Pat. No. Re. 27, 644 to Kelly and Grosheim discloses a laminate coated on its back surface with a polyvinyl acetate composition. However, laminates produced in accordance with this technique have the disadvantage of not being easily consolidated in contact with one another in a stack without adhering to one another during the consolidation process.

U.S. Patent Application No. 600,225, filed July 30, 1975 in the names of William A. Hosmer and William M. Bowler, discloses a gluable backing sheet which becomes the back surface of a decorative laminate during consolidation and provides a surface which is gluable to reinforcing substrates with a variety of the most commonly used glues. In addition, the Hosmer/Bowler invention provides the ability to consolidate laminates in back-to-back arrangement by providing a pair of backing sheets placed together between laminates, with each backing sheet adhering to a different laminate. The backing sheet is coated with a composition of an inert filler (such as clay), a non-thermoplastic adhesive (such as proteinaceous adhesives) and a water-soluble, thermosetting resin selected from the class consisting of urea-formaldehyde resin condensates and melamine-formaldehyde resin condensates. A disadvantage of the Hosmer/Bowler invention is that two separate coated backing sheets are required when consolidating laminates in back-to-back configuration.

U.S. Pat. No. 4,030,955 to Antonio and Uhl, discloses a transferable, gluable coating which adheres to the back surfaces of the decorative laminates during the consolidation step and provides a gluable surface which can be adhered to a reinforcing substrate without sanding the back surface of the laminate. The gluable layer is first coated on both sides of a release film of polypropylene and placed between back-to-back laminate assemblies. The coating then transfers to the laminate during consolidation. The gluable coating material employed is chosen from polyvinyl alcohol, animal glue and starch. A disadvantage of this invention is that the gluable coatings must be transferred from only particular release mediums, such as polypropylene sheets. If the gluable coating of Antonio/Uhl is transferred from a paper sheet coated with a release material, which is a particularly satisfactory and inexpensive release medium for separating laminates during consolidation, the gluability of the coating can be seriously impaired.

SUMMARY OF THE INVENTION

It is an object of the invention to provide a decorative laminate with a gluable coating on its back surface suitable for gluing the decorative laminate to a reinforcing substrate with the most commonly employed glues and without first sanding the back surface of the laminate.

It is a further object of the invention to provide a coated sheet material comprising a release medium having coated thereon a gluable coating which will transfer from the release medium to the back surface of a decorative laminate during the consolidation step.

It is yet a further object of the invention to provide a gluable coating which can be transferred satisfactorily to the back surface of a decorative laminate during consolidation from a release medium provided by a paper sheet coated with a release material.

And it is a further object of the invention to provide a coated sheet material which can be used to separate decorative laminates when they are being consolidated in back-to-back configuration.

These and other objects are accomplished by the products and methods of the invention which feature a transferable, gluable coating comprising a linear copolymer of (A) maleic anhydride or maleic acid or maleic acid salt and (B) ethylene, or a vinyl monomer having a side chain of either an aliphatic group with up to four carbon atoms or an alkoxy group with up to four carbon atoms.

The invention is a coated sheet material comprising a release medium which is coated on at least one side with the featured transferable, gluable coating. The invention is also the method of transferring the featured gluable coating to the back surface of a laminate during the laminate consolidation step. The invention is also a decorative heat-and-pressure consolidated laminate having on its back surface the featured gluable coating. The invention is also the method of gluing the decorative laminate with the featured gluable coating to a reinforcing substrate. And the invention is also a reinforced decorative laminate in which the featured gluable coating provides a glue line between the laminate and the glue which adheres the laminate to the reinforcing substrate. Preferred embodiments of the invention are set forth and described in the Description of the Preferred Embodiments and in the claims.

DESCRIPTION OF THE PREFERRED EMBODIMENTS

The following examples illustrate the present invention. Examples 1-7 are actual examples of the present invention, and Examples 8-10 are examples of the prior art included for comparative purposes.

EXAMPLE 1

A release medium was prepared from a base paper made from highly refined long fibers and having a basis weight of about 57 lbs. per ream. (Throughout this specification the term "ream" shall refer to 3300 square feet.) The base paper was surface sized with a conventional poly(vinyl alcohol) and starch composition and then calendered for smoothness. A release coating was prepared by mixing 100 parts (by dry weight) of a copolymer of 1-octadecene and amleic anhydride and 32 active parts of potassium hydroxide with sufficient water to provide 15% solids. The copolymer was provided by Gulf Oil Corporation's PA-18 (a linear, low molecular weight 1:1 copolymer with the following properties: melting range-90°-101° C.; acid no. 321; molecular weight-1300; specific gravity 0.889; inherent viscosity 0.081, based on 5.0 g./dl. acetone at 77° F.) The coating was cooked at 190° F. for ½-1 hour to form a clear solution and then was coated on both sides of the base paper with an air knife and dried. The coat weight on each side was 1½-2 lbs. per ream.

A transferable, gluable coating formulation of the invention was prepared as follows. 100 parts (by dry weight) of a copolymer of ethylene and maleic anhydride were mixed with 12½ parts of Calgon (sodium hexametaphosphate, used as a wetting agent) and sufficient water to provide 10% solids. The copolymer was provided by Monsanto's EMA-11 (a linear 1:1 copolymer with the following properties: molecular weight-8,000; viscosity of 2% solution-2.0 cps.; softening point-170° C.; melting point-235° C.; bulk density-20 lbs./ft.$^3$; pH of 1% solution-2.3). The coating mixture was cooked at 190° F. for ½-1 hour to form a clear solution and then coated with an air knife coater on both sides of the release medium described above and dried. The coat weight on each side was 3 lbs. per ream.

The coated sheet material was then employed and tested in the following manner. A decorative, heat and pressure consolidated laminate was prepared by assembling in the following order, one decorative sheet which had previously been saturated with melamineformaldehyde resin, three sheets of corestock which had previously been saturated with a phenolic resin, and the coated sheet material described immediately above. Two such laminates were pressed simultaneously in back-to-back configuration with a single piece of the coated sheet material separating the two laminates, and with each of the decorative sheets in contact with a caul plate. Between each of the caul plates and the pess platens, there was inserted a sheet of unimpregnated caul stock, which was merely intended to even pressure distribution over the surfaces of the laminates being pressed. The laminates were pressed for 20 minutes at 280° F. and at a pressure of 1200 lbs. per square inch to consolidate them, and then the press was cooled for about five minutes in order to allow the caul plates to approach room temperature. Upon removal of the laminates from the press, they were easily separated from the coated sheet material, and the gluable layer on each side of the coated sheet material was found to have substantially completely transferred to the back surface of its respective laminate.

Each of the resulting laminates were then subsequently glued to a reinforcing substrate in the form of a ⅜ inch thick particle board to which there had previously been applied a very commonly used polyvinyl acetate glue (National Starch's Wood-Lok No. 40-0536) at a rate of from about 10 to about 20 lbs. of glue per 1000 square feet of particle board. The amount of glue applied was intended to be sufficient to thoroughly and uniformly coat the entire surface of the particle board to which the laminates were being glued, yet minimize the "squeeze out" of the glue during the gluing step. Each of the laminates were pressed onto the particle board with the back side down (the side with the gluable layer), and then placed in a press at 50-75 lbs. per square inch pressure and at room temperature for approximately one hour. Upon removal from the press, the glued samples were then allowed to further set for an additional 24 hours, during which time the faces of each of the samples were scarified with a saw the full length of the face at one-inch intervals and down through the thickness of the laminate and into the particle board for testing purposes.

The testing of the samples involves pulling a strip of the laminate from the surface of the particle board and then observing the amount of wood particles which separated from the particle board and adhered to the back of the stripped laminate (the greater the number of particles, the better the bond). Wood particles adhering to the back of the stripped laminate were found to cover about 10% of the surface of the laminate. This amount is considered satisfactory for a test made after only 24 hours.

EXAMPLE 2

A coated sheet material like that of Example 1 was prepared, except that the particular copolymer in the gluable coating of Example 1 was replaced with another ethylene maleic anhydride copolymer, Monsanto's EMA-31 (which differs from EMA-11 by having a molecular weight of 100,000 and a viscosity of 7.0 cps.

for a 2% solution). The coat weight on each side of the coated sheet material of Example 2 was 4 lbs. per ream. The coated sheet material was employed in the same manner as in Example 1. Again the gluable layer substantially completely transferred from the release medium to the back surface of the consolidated laminate. The laminate was tested in the same manner as in Example 1, and wood particles adhering to the back of the stripped laminate were found to cover 40%–90% of the surface of the laminate for a number of samples.

EXAMPLE 3

A coated sheet material like that of Example 1 was prepared, except that the copolymer in the gluable coating of Example 1 was replaced with a copolymer of maleic acid salt and a vinyl monomer having a side chain of an aliphatic group with four carbon atoms, Gulf Oil Corporation's PA-6 (a linear, low molecular weight 1:1 copolymer with the following properties: melting range 143°–166° C.; equivalent acid value-617; specific gravity 0.92; inherent viscosity 0.098 based on 5.0 g./dl. acetone at 77° F.; and molecular weight of 5000). The copolymer was 100% neutralized with potassium hydroxide, and the coat weight on each side of the coated sheet material was 2 lbs. per ream. The coated sheet material was employed in the same manner as in Example 1. Again the gluable layer substantially completely transferred from the release medium to the back surface of the consolidated laminate. The laminate was tested in the same manner as in Example 1, and wood particles adhering to the back of the stripped laminate were found to cover 5–10% of the surface of the laminate. This amount is considered satisfactory for a test made after only 24 hours.

EXAMPLE 4

A coated sheet material like that of Example 1 was prepared, except that the copolymer in the gluable coating was replaced with a copolymer of maleic anhydride and a vinyl monomer having a side chain of an alkoxy group with one carbon atom, G.A.F.'s GANTREZ AN-119 (a linear poly(methyl vinyl ether/maleic anhydride) having the following properties: low molecular weight; coefficient of viscosity-0.1–0.5 as determined on a solution of 1 gm. in 100 ml. of MEK at 25° C.). The coat weight on each side of the coated sheet material was 5 lbs. per ream. The coated sheet material was employed in the same manner as in Example 1. Again the gluable layer substantially completely transferred from the release medium to the back surface of the consolidated laminate. The laminate was tested in the same manner as in Example 1, and wood particles adhering to the back of the stripped laminate were found to cover 10% of the surface of the laminate.

EXAMPLE 5

A coated sheet material like that of Example 1 was prepared, except that the copolymer in the gluable coating was replaced with a copolymer of maleic acid and a vinyl monomer having a side chain of an alkoxy group with one carbon atom, G.A.F.'s GANTREZ S-95 (hydrolyzed low molecular weight poly(methyl vinyl ether/maleic acid). The coat weight on each side of the coated sheet material was 4 lbs. per ream. The coated sheet material was employed in the same manner as in Example 1. Again the gluable layer substantially completely transferred from the release medium to the back surface of the consolidated laminate. The laminate was tested in the same manner as in Example 1, and wood particles adhering to the back of the stripped laminate were found to cover 40%–70% of the surface of the laminate for a number of samples.

EXAMPLE 6

A coated sheet material like that of Example 2 was prepared, except that the release medium was provided by a 1 mil thick polypropylene sheet and the transferable, gluable coating was applied to the sheet by rod drawdown to result in a dried coating weight on each side of from 4 to 5 lbs. per ream. The coated sheet material was employed in the same manner as in Example 1. Again the gluable layer substantially completely transferred from the release medium to the back surface of the consolidated laminate. The laminate was tested in the same manner as in Example 1, and wood particles adhering to the back of the stripped laminate were found to cover 60% of the surface of the laminate.

EXAMPLE 7

All of the steps of Example 2 were repeated, except that the laminate was glued to a reinforcing particle board with Borden's Cascorez WB-732 polyvinyl acetate glue. (This glue is less commonly used than the Wood-Lok glue, but is more versatile in the variety of surfaces it will adhere to.) Wood particles adhering to the back of the stripped laminate were found to cover 50% of the surface of the laminate.

EXAMPLE 8

A commercially available sheet of the type disclosed in U.S. Pat. No. 4,030,955 to Antonio and Uhl and having a gluable coating of polyvinyl alcohol coated on a 1 mil thick polypropylene sheet was used to consolidate a laminate in the manner of the previous examples. The laminate was glued to a reinforcing substrate and tested in the manner of Example 7, and wood particles adhering to the back of the stripped laminate were found to cover 40% of the surface of the laminate.

EXAMPLE 9

A coated sheet material similar to that of Example 8 was prepared by coating polyvinyl alcohol (DuPont's Elvanol 51-05, low molecular weight resin, with viscosity of 4–6 cp. for a 4% aqueous solution at 20° C. determined by Hoeppler falling ball method, 87.7-89.7% hydrolysis, and pH of 5.0–7.0) on the same release medium employed in Examples 1–5 and 7. The coat weight on each side of the release medium was 15 lbs. per ream, chosen to simulate the coat weight on the commercially available sheet of Example 8. The coated sheet material was used in forming a consolidated laminate and tested as in Example 8. However, essentially no wood particles were found on the laminate surface after stripping, indicating that the polyvinyl alcohol coating is unsuitable as a gluable layer for the most commonly used glues when the coating has been transferred from a release material on the surface of paper.

EXAMPLE 10

A coated sheet material like that of Example 9 was prepared, except the release medium was provided by a 1 mil thick polypropylene sheet. The coated sheet material was used in forming a consolidated laminate and tested as in Example 9, and wood particles adhering to the back of the stripped laminate were found to cover 70% of the surface of the laminate.

In order to determine how well a laminate is secured to a reinforcing substrate, the above-described stripping test is performed at various times after glueing and after subjecting the reinforced laminate to various conditions. For example, the reinforced laminate may be tested after 4 hours, after 24 hours, or after several days, or it may be tested after being subjected to a freeze and/or heat cycle. It has been found that a good indication of the future performance can be obtained from the 24 hour test employed in the preceding examples. A finding of any significant wood fiber coverage on the stripped laminate at 24 hours indicates a successful embodiment, since the performance level will usually continue to improve with time. For example, 10% coverage or more is considered satisfactory. Even the 5%-10% coverage of Example 3 was satisfactory, since further tests of this embodiment showed significantly better results.

The gluable coating of the invention can be coated on only one side of the release medium, but preferably it is coated on both sides. Coating on both sides permits the coated sheet material to be used in consolidating two laminates together in back-to-back configuration. It should be noted here that the release medium after the gluable coating has been transferred can generally be used as a conventional separator sheet to accommodate back-to-back consolidation of two laminates in the manner of the prior art. However, the laminates consolidated in this manner will not have a gluable layer and will probably have to be sanded before gluing them to reinforcing substrates.

The release medium can be provided by a variety of materials, such as the two disclosed in the examples. Coated release paper is the most desirable because of its low cost. A number of other conventional release materials coated on paper were tried, and most were found satisfactory. It is important, however, that the base paper be properly prepared. Tests conducted on un-calendered paper and on excessively porous paper with otherwise satisfactory release materials on their surfaces indicated that they were unsatisfactory in their ability to transfer the gluable coating to the laminate. Thus, the same design considerations normally attendant with manufacturing any quality release papers also applies to the release medium employed in the present invention. It is easily within the capability of one having ordinary skill in making release papers to provide a satisfactory release medium for use in the present invention. The most preferred release medium is the one used in Examples 1-5 and 7, the copolymer of 1-octadecene and maleic anhydride coated on paper. This material is one of the most inexpensive and satisfactorily performing release mediums.

The preferred gluable coating material is the copolymer of maleic anhydride and ethylene, particularly the higher viscosity EMA-31 of Example 2. However, cross-linked varieties of maleic anhydride and ethylene were found to be unsatisfactory, and only the linear copolymers seem to be satisfactory.

The useful copolymers include those in the form of maleic anhydride, those hydrolyzed to maleic acid form, and those which are neutralized to the maleic acid salt form. Where a vinyl monomer is part of the copolymer the length of the side chain affects its ability to provide satisfactory gluability. Although varieties having all potential chain lengths were not tested, those tested in addition to the examples indicate that the aliphatic or alkoxy groups should not have more than 4 carbon atoms. The amount of the gluable coating to be attached to the laminate is not narrowly critical, but tests indicate that an amount of from about ½ lb. to 7 lbs. per ream is preferred.

Having now described the preferred embodiments, variations within the scope of the invention will be obvious to those skilled in the art.

What is claimed is:

1. A coated sheet material for use in the preparation of decorative heat-and-pressure consolidated laminates, comprising a base paper over which is coated on both sides a release material useful in the manufacture of release paper and over each coating of release material a transferable, gluable coating comprising a linear copolymer of (A) maleic acid or maleic anhydride or maleic acid salt and (B) ethylene, or a vinyl monomer having one side chain of either an aliphatic group with up to four carbon atoms or an alkoxy group with up to four carbon atoms.

2. A coated sheet material for use in the preparation of decorative heat-and-pressure consolidated laminates, comprising a paper sheet coated on at least one side with a first layer of a copolymer of 1-octadecene and maleic anhydride and on top of the first layer a second layer of a transferable, gluable coating comprising a linear copolymer of (A) maleic acid or maleic anhydride or maleic acid salt and (B) ethylene, or a vinyl monomer having one side chain of either an alaphatic group with up to four carbon atoms or an alkoxy group with up to four carbon atoms.

3. The coated sheet material according to claim 2, wherein the transferable, gluable coating is coated on both sides of the release medium.

4. The coated sheet material according to claim 3, wherein the transferable, gluable coating is coated on the release medium in an amount of from about ½ lb. to about 7 lbs. per ream of 3300 square feet on each side of the release medium.

5. The coated sheet material according to claims 2, 3 or 4, wherein component (B) of the copolymer of the transferable, gluable coating is provided by ethylene.

6. In a method of forming a decorative heat-and-pressure consolidated laminate by assembling between platens a plurality of superimposed plies of thermosetting resin impregnated sheets and a release medium having a transferable, gluable coating on the side of the release medium placed against an outermost ply, and applying heat and pressure through the platens to consolidate the laminate and to transfer the gluable coating from the release medium to the outermost ply,
   the improvement wherein the gluable coating comprises a linear copolymer of (A) maleic acid or maleic anhydride or maleic acid salt and (B) ethylene, or a vinyl monomer having one side chain of either an aliphatic group with up to four carbon atoms or an alkoxy group with up to four carbon atoms.

7. The improved method of claim 6, wherein two laminates are consolidated between a pair of platens in back-to-back configuration with the release medium between the two laminates, and the release medium has the transferable, gluable coating on both sides.

8. The improved method of claim 6, wherein the transferable, gluable coating is coated on the release medium in an amount of from about ½ lb. to about 7 lbs. per ream of 3300 square feet.

9. The improved method of claim 6, wherein the release medium is provided by a paper sheet coated with a copolymer of 1-octadecene and maleic anhydride.

10. The improved method of claims 6, 7, 8 or 9, wherein component (B) of the copolymer of the transferable, gluable coating is provided by ethylene.

* * * * *